United States Patent [19]

Fields

[11] Patent Number: 4,495,072
[45] Date of Patent: Jan. 22, 1985

[54] FILTER SCREEN DEVICE

[75] Inventor: Larry D. Fields, Mira Loma, Calif.

[73] Assignee: Yardney Corporation, Pawcatuck, Conn.

[21] Appl. No.: 469,546

[22] Filed: Feb. 25, 1983

[51] Int. Cl.³ .................. B01D 27/12; B01D 29/14; B01D 29/38
[52] U.S. Cl. .................. 210/238; 210/315; 210/433.1; 210/447; 210/448; 210/450; 210/454; 210/470; 210/489; 210/499; 55/301; 55/330; 55/337
[58] Field of Search ............ 210/409, 420, 422, 428, 210/433.1, 447, 237, 238, 453, 454, 438, 439, 470, 457, 458, 304, 232, 305, 306, 456, 450, 512.1, 489, 499, 338; 55/301, 330, 337, 379, 502, 503

[56] References Cited

U.S. PATENT DOCUMENTS

| | | | |
|---|---|---|---|
| 1,273,608 | 7/1918 | Hildebrand | 210/433.1 |
| 1,559,941 | 11/1925 | Demaree | 210/422 |
| 2,081,198 | 5/1937 | Hahn | 210/454 |
| 2,528,094 | 10/1950 | Walker | 210/512.1 |
| 2,759,557 | 8/1956 | Gordon | 210/306 |
| 3,085,689 | 4/1963 | Hering et al. | 210/232 |
| 3,155,614 | 11/1964 | Wendlenner | 210/453 |
| 3,224,590 | 12/1965 | Nord et al. | 210/438 |
| 3,481,474 | 12/1969 | Paulson | 210/304 |
| 3,695,443 | 10/1972 | Schmidt, Jr. | 210/457 |
| 4,253,856 | 3/1981 | Paucha | 55/379 |
| 4,279,746 | 7/1981 | Leutz | 210/420 |

FOREIGN PATENT DOCUMENTS

| | | | |
|---|---|---|---|
| 823821 | 12/1951 | Fed. Rep. of Germany | 210/409 |
| 2725498 | 12/1977 | Fed. Rep. of Germany | 210/304 |
| 2731755 | 1/1979 | Fed. Rep. of Germany | 55/337 |
| 665929 | 6/1979 | U.S.S.R. | 210/409 |

Primary Examiner—Ernest G. Therkorn
Attorney, Agent, or Firm—Donald E. Nist

[57] ABSTRACT

An improved filter screen device is provided which comprises an elongated, tubular housing, a hollow elongated perforated tubular member releasably secured in the hollow central interior of the housing and a flexible sock-type filter screen releasably disposed over the outer surface of the tubular member in the housing. The housing includes an open upstream end which is closed by the tubular member and a closed opposite downstream end. An inlet is disposed at an acute angle to the length of the housing and intersects the housing interior between its upstream and downstream ends. A first outlet is disposed at the downstream end along about the longitudinal axis of the housing so as to communicate with the interior of the hollow tubular member. A second outlet is also disposed in the downstream end of the housing at an angle to the first outlet and communicates with a space between the filter screen and the housing. The inlet is configured to cause liquid passing therethrough into the housing to spiral over the outer face of the screen. Liquid passing through the screen and the perforated tubular member exits the device through the first outlet while particles removed from the stream by failure to pass through the screen are removed from the space between the screen and housing through the second outlet.

2 Claims, 4 Drawing Figures

U.S. Patent   Jan. 22, 1985   4,495,072
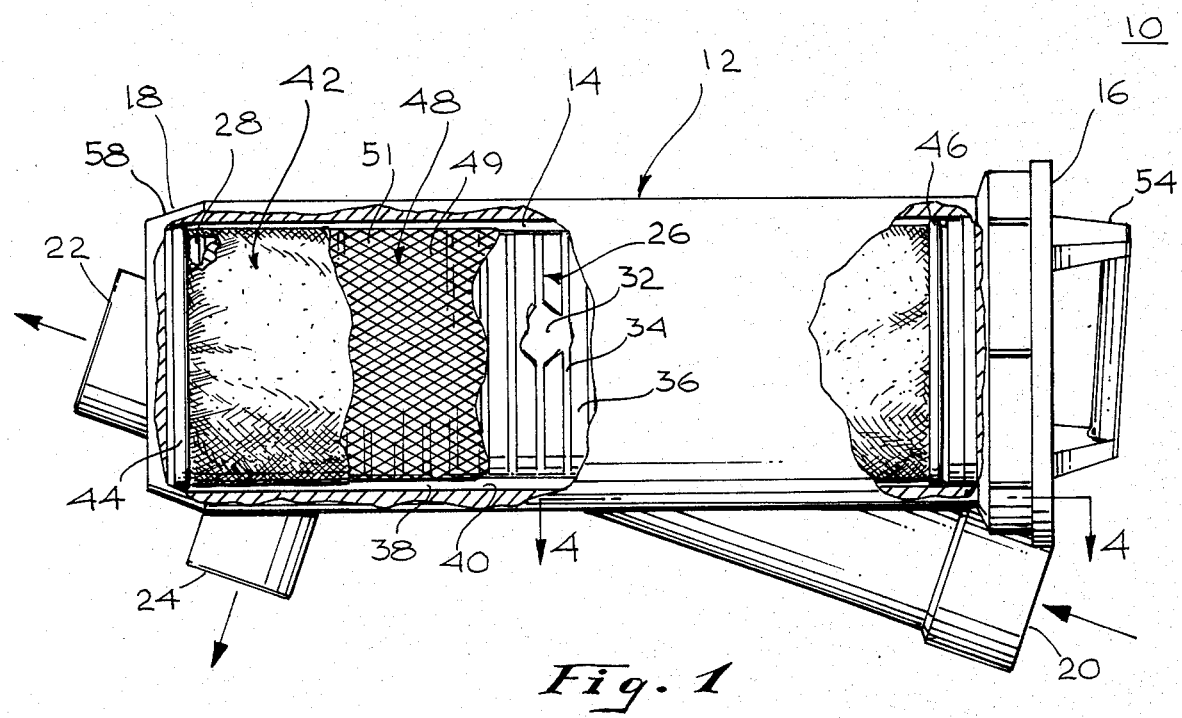
Fig. 1
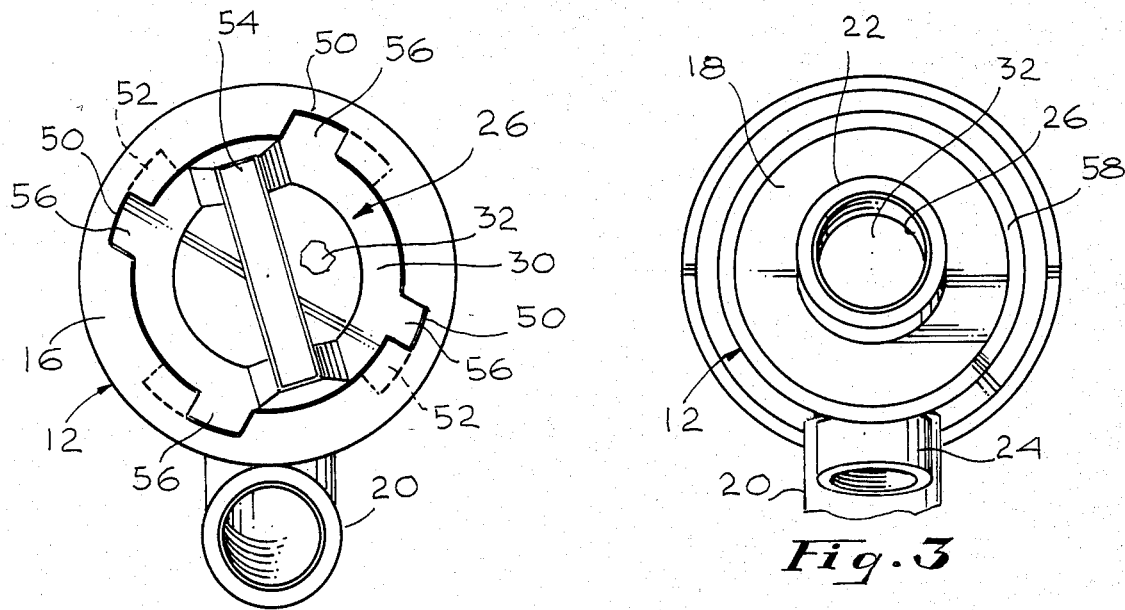
Fig. 2
Fig. 3
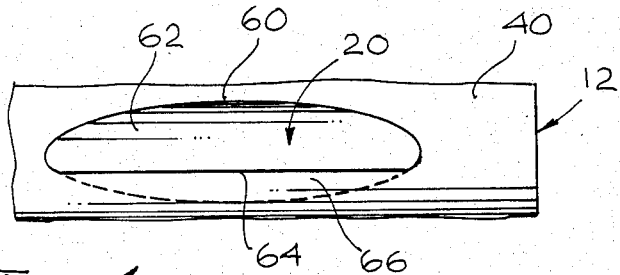
Fig. 4

FILTER SCREEN DEVICE

BACKGROUND OF THE INVENTION

1. Field of the Invention

The present invention generally relates to filter devices and more particularly relates to an improved type of filter screen device for water and the like liquids.

2. Prior Art

Various types of filter devices have been employed in systems utilized to purify agricultural, industrial, landscaping, potable waters and the like liquids. In many of said systems the filters employed are difficult to remove in order to clean, replace, repair and the like. Most of the filter devices which are capable of processing substantial amounts of water are cumbersome, difficult to open and expensive.

It would be desirable to be able to provide an improved filter device for use with agricultural, industrial waters and the like, which device should be of relatively small size, high efficiency and low cost. The device should be readily openable for easy access to the filter components thereof for easy replacement and repair thereof. Preferably, the filter used in such a device should in itself be inexpensive and easy and rapid to replace.

SUMMARY OF THE INVENTION

The improved filter screen device of the present invention satisfies all of the foregoing needs. The device is substantially as set forth in the Abstract above. Thus, the device includes an elongated hollow tubular housing having an upstream end which is open and a closed downstream end. The housing releasably receives an elongated hollow tubular member which has perforations extending therethrough. The tubular member is closed at its upstream end so that it seals off the upstream end of the housing. The tubular member is open at its downstream end and has a hollow interior. The housing has an inlet extending in a downstream direction at an angle to the longitudinal axis of the housing and positioned between the upstream and downstream ends of the housing. The housing also includes a first outlet generally in line with the longitudinal axis thereof at the downstream end and in communication with the interior of the tubular member. The housing further includes a second outlet at the downstream end at an angle, preferably perpendicular, to the first outlet and communicating with the space between the tubular member and housing within the interior thereof. This outlet is used as a drain to remove particles from the device.

A sock type flexible filter screen is releasably disposed over the tubular member and is held in place with, for example, O-rings at opposite ends thereof. The tubular member has a plurality of slots spaced along the length thereof and preferably an intermediate screen or grid is disposed between the tubular member and the filter screen to hold the screen away from the tubular member so as to improve its filtration efficiency. In this regard, the intermediate grid has a larger total surface area of openings than does the tubular member.

The inlet preferably has an opening at the intersection with the housing interior, which opening is provided with a lip along one portion of the oval length thereof so that liquid passing into the housing through the opening is directed at an angle against the filter screen. Such liquid spirals down the outer surface of the filter screen, passing through the screen and grid and through the tubular member into its interior and then from the device through the first outlet. Particles unable to pass through the screen are removed from the space between the screen and housing through the second outlet.

The closed upstream end of the tubular member is provided with a handle and spaced radially extending tabs which fit into slots in the upstream end of the housing. The tubular member can be locked in place in the housing by fully inserting it into housing and then rotating it with the handle so that the tabs are disposed in the retaining portions of the slots. Various other features of the present invention are set forth in the following detailed description and accompanying drawings.

BRIEF DESCRIPTION OF DRAWINGS

FIG. 1 is a schematic side elevation, partly broken away, of a preferred embodiment of the improved filter screen device of the present invention;

FIG. 2 is a schematic end view of the upstream end of the device of FIG. 1;

FIG. 3 is a schematic end view of the downstream end of the device of FIG. 1; and, FIG. 4 is a schematic sectional view taken along the section line 4—4 of FIG. 1 showing the shape and nature of the opening from the inlet at its intersection with the hollow interior of the housing of the device of FIG. 1.

DETAILED DESCRIPTION OF THE DRAWINGS

FIGS. 1-4

FIG. 1 of the accompanying drawings is a schematic side elevation, partly broken away, illustrating a preferred embodiment of the improved filter screen device of the present invention. Thus, device 10 is shown which comprises an elongated tubular housing 12 having a hollow central interior 14, an open upstream end 16 and a closed opposite downstream end 18. Housing 12 is preferably generally cylindrical, as shown in FIGS. 2 and 3, and may be fabricated of any suitable material, such as corrosion resistant metal, for example, aluminum, titanium, magnesium, stainless steel or the like, or a polymeric material such as polyvinyl chloride, polyvinyl acetate, polypropylene, a phenolic resin, urea-formaldehyde resin, synthetic or natural rubber adequately hardened, fiberglass, etc. A ceramic or clay material could also be used.

Housing 12 has an inlet 20 which is disposed at an acute angle to the main axis of the housing, as shown particularly in FIG. 1, and intersects interior 14 in a downstream direction between ends 16 and 18. Housing 12 also includes a first outlet 22 at downstream end 18, which outlet 22 is generally in line with inlet 20. Housing 12 further includes a second outlet 24 disposed perpendicular to first outlet 22 at downstream end 18.

Device 10 also includes a hollow, elongated, perforated, generally cylindrical tubular member 26 having an open downstream end 28 and a closed upstream end 30. Outlet 22 communicates with the hollow central interior 32 of member 26. Member 26 is provided with a plurality of spaced slots 34 extending transversely along the length thereof, which slots 34 are disposed through the sidewall 36 of member 26. Member 26 can be fabricated of any suitable material such as that described for housing 12 and is dimensioned so that it fits within housing 12 along the length thereof to provide a small annular space 38 between sidewall 36 and sidewall 40 of housing 12. In space 38 is provided around sidewall 36 of member 26 a removable, flexible, fine pored filter screen 42 held in place over tubular member 26, as by flexible, resilient O-rings 44 and 46 fabricated of, for example, natural or synthetic rubber or the like. Preferably O-rings 44 and 46 fit into grooves (not shown) in the surface of sidewall 36. Filter screen 42 can be fabricated of any suitable material such as nylon mesh, polyethylene, polypropylene, etc. The porosity of filter screen 42 can vary, depending upon its use. For example, a typical filter screen 42 for filtration of agricultural waters will have an average pore diameter of about 0.016" to about 0.001".

Preferably, there is disposed between sidewall 36 and filter screen 42 an intermediate grid 48 of flexible material, such as polyethylene, etc. Grid 48 comprises a plurality of crisscrossed ribs 49 which support screen 42 and define pores 51 for passage of filtered water to and into member 26. Grid 48 may have, for example, pores 51 of an average diameter of about 0.09" to about 0.15" covering approximately 70% to about 90% of the entire surface of grid 48, that is of substantially greater total surface area than the combined surface area of slots 34 in sidewall 36. The function of grid 48 is to hold the bulk of filter screen 42 away from sidewall 36 so as to permit a greater area of filter screen 42 to perform its filtering function. If grid 48 is not present, then the portions of filter screen 42 which overlie the portions of sidewall 36 unoccupied by slots 34 would provide substantially no filtering function.

As can be shown particularly in FIGS. 1 and 2, the upstream end 16 of housing 12 is somewhat expanded in diameter relative to the main body of housing 12 and is provided with a plurality of radial slots 50 disposed along the inner perimeter thereof. Slots 50 include recessed undercut portions 52 which are mainly shown in dotted outline in FIG. 2. Upstream end 30 of tubular member 26 is configured to provide a handle 54 and a plurality of radially extending tabs 56 which fit into slots 50. It will also be noted that closed downstream end 18 of housing 12 includes a tapered down portion 58 against which O-ring 44 resiliently abuts when tubular member 26 is inserted all of the way into housing 12. Member 26 can be locked into place in housing 12 by aligning tabs 56 with slots 50, forcing O-ring 44 against portion 58 until recessed portions 52 are reached by tabs 56 and then rotating tabs 56 by handle 54 into recessed portions 52. The resiliency of O-ring 44 keeps tabs 56 firmly locked in portions 52 and prevents movement of member 26 in housing 12 during flow of water therethrough.

As can be shown more particularly in FIG. 4 of the drawings, the inner end 60 of inlet 20 is provided with an opening 62 which is an elongated oval extending longitudinally in housing wall 40. One side 64 of end 60 defining opening 62 is provided with a lip 66, a portion of which is shown in dotted outline in FIG. 4, and which has the effect of projecting liquid passing from inlet 20 into space 38 against filter screen 42 at an angle thereto to assure that such liquid spirals down the length of screen 42 for maximum contact therewith.

The efficiency of filter device 10 is high. It can use filter screens 42 of any suitable porosity, for example, 50–400 U.S. Standard mesh or more to perform filtering operations on a variety of liquids such as agricultural, industrial, landscaping and potable waters. The device is capable of performing efficiently at a relatively high flow rate. The spiral or vortex like flow of liquid through space 38 has the effect of casting particles outwardly toward sidewall 40 of housing 12 to increase the efficiency of the system. Outlet 24 is placed in a position which allows heavy particles spun out by this action to settle and pass therethrough so as to keep the fine mesh filter screen 42 free of debris for longer life and efficiency. Further features of the present invention are as set forth in the foregoing.

Various changes, modifications, alterations and additions can be made in the improved filter screen device of the present invention, its components and parameters. All such changes, modifications, alterations and additions as are within the scope of the appended claims form part of the present invention.

What is claimed is:

1. An improved filter screen device, said device comprising, in combination:
   a. an elongated tubular housing having a hollow central interior, an open upstream end communicating with said interior and an enclosed end wall at the opposite downstream end, an inlet disposed at an acute angle to the main axis of said housing, intersecting said interior between said upstream and downstream ends, converging with the tubular housing in the direction of the downstream end and configured to cause liquid passing therethrough into said housing to spiral over the outer face of said screen, a first outlet extending through said end wall at said downstream end about perpendicular to said first outlet;
   b. a hollow elongated perforated tubular member releasably secured in said housing interior and having an open downstream end and a closed upstream end, the latter sealing said upstream end of said housing, said first outlet being in communication with the interior of said tubular member at the downstream end thereof, said tubular member having annular slots spaced longitudinally on the exterior thereof about perpendicular to the longitudinal axis thereof, and having a handle connected to the closed upstream end thereof and tabs which fit into slots in said upstream end of said housing, said tubular member being insertable into said housing and rotatable therein to lock to said housing by said tabs;
   c. a flexible sock type filter screen releasably disposed over the outer surface of said tubular member and spaced inwardly of said housing to define therewith an annular space with which said second outlet is in communication;
   d. an intermediate grid disposed between said screen and said tubular member to hold said screen away from said tubular member for improved filtration; and,
   e. O-rings clamping said screen to said grid, said downstream end of said housing having converging walls against which one of said O-rings resiliently abuts when said tubular member locks in said housing.

2. The improved filter screen device of claim 1 wherein said inlet at the intersection thereof with said housing interior has an opening which is oval, being elongated along the length of said housing and wherein one side of said inlet has a lip extending over said opening so as to direct liquid out of said opening in a diagonal direction against said screen.

* * * * *